United States Patent
Rajamony et al.

(10) Patent No.: US 7,698,508 B2
(45) Date of Patent: Apr. 13, 2010

(54) SYSTEM AND METHOD FOR REDUCING UNNECESSARY CACHE OPERATIONS

(75) Inventors: Ramakrishnan Rajamony, Austin, TX (US); Hazim Shafi, Austin, TX (US); William Evan Speight, Austin, TX (US); Lixin Zhang, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 388 days.

(21) Appl. No.: 11/674,960

(22) Filed: Feb. 14, 2007

(65) Prior Publication Data

US 2007/0136535 A1 Jun. 14, 2007

Related U.S. Application Data

(62) Division of application No. 11/032,875, filed on Jan. 11, 2005.

(51) Int. Cl.
*G06F 12/00* (2006.01)
(52) U.S. Cl. .................................... 711/143
(58) Field of Classification Search ............. None
See application file for complete search history.

(56) References Cited

U.S. PATENT DOCUMENTS

| 5,317,720 | A | | 5/1994 | Stamm et al. | |
|---|---|---|---|---|---|
| 5,564,035 | A | * | 10/1996 | Lai | 711/144 |
| 5,787,478 | A | * | 7/1998 | Hicks et al. | 711/141 |
| 5,829,038 | A | * | 10/1998 | Merrell et al. | 711/143 |
| 6,134,634 | A | * | 10/2000 | Marshall et al. | 711/143 |
| 6,282,615 | B1 | * | 8/2001 | Arimilli et al. | 711/122 |
| 6,349,367 | B1 | * | 2/2002 | Arimilli et al. | 711/143 |
| 6,629,210 | B1 | | 9/2003 | Arimilli et al. | |
| 2004/0236912 | A1 | * | 11/2004 | Glasco | 711/141 |

OTHER PUBLICATIONS

Horvath, Thomas, JR., Office Action dated Nov. 8, 2006, U.S. Appl. No. 11/032,875.
Horvath, Thomas, JR., Final Office Action dated Apr. 23, 2007, U.S. Appl. No. 11/032,875.

* cited by examiner

*Primary Examiner*—Matt Kim
*Assistant Examiner*—Kaushikkumar Patel
(74) *Attorney, Agent, or Firm*—Dillon & Yudell LLP

(57) ABSTRACT

A system and method for cache management in a data processing system. The data processing system includes a processor and a memory hierarchy. The memory hierarchy includes at least an upper memory cache, at least a lower memory cache, and a write-back data structure. In response to replacing data from the upper memory cache, the upper memory cache examines the write-back data structure to determine whether or not the data is present in the lower memory cache. If the data is present in the lower memory cache, the data is replaced in the upper memory cache without casting out the data to the lower memory cache.

8 Claims, 3 Drawing Sheets

SYSTEM AND METHOD FOR REDUCING UNNECESSARY CACHE OPERATIONS

CROSS-REFERENCE TO RELATED APPLICATIONS

The present application is a divisional of U.S. patent application Ser. No. 11/032,875, filed on Jan. 11, 2005. Applicants claim benefit of priority under 35 U.S.C. §120 to U.S. patent application Ser. No. 11/032,875, which is incorporated by reference herein in its entirety and for all purposes.

BACKGROUND OF THE INVENTION

1. Technical Field

The present invention relates in general to data processing systems, and more particularly, to an improved multi-processor data processing system. Still more particularly, the present invention relates to improved cache operation within multi-processor data processing systems.

2. Description of the Related Art

A conventional multi-processor data processing system (referred to hereinafter as an MP), typically includes a system memory, input/output (I/O) devices, multiple processing elements that each include a processor and one or more levels of high-speed cache memory, and a system bus coupling the processing elements to each other and to the system memory and I/O devices. The processors all utilize common instruction sets and communication protocols, have similar hardware architectures, and are generally provided with similar memory hierarchies.

Caches are commonly utilized to temporarily store values that might be accessed by a processor in order to speed up processing by reducing access latency as compared to loading needed values from memory. Each cache includes a cache array and a cache directory. An associated cache controller manages the transfer of data and instructions between the processor core or system memory and the cache. Typically, the cache directory also contains a series of bits utilized to track the coherency states of the data in the cache.

With multiple caches within the memory hierarchy, a coherent structure is required for valid execution results in the MP. This coherent structure provides a single view of the contents of the memory to all of the processors and other memory access devices (e.g., I/O devices). A coherent memory hierarchy is maintained through the utilization of a coherency protocol, such as the MESI protocol. In the MESI protocol, an indication of a coherency state is stored in association with each coherency granule (e.g., a cache line or sector) of one or more levels of cache memories. Each coherency granule can have one of the four MESI states, which is indicated by bits in the cache directory.

The MESI protocol allows a cache line of data to be tagged with one of four states: "M" (modified), "E" (exclusive), "S" (shared), or "I" (invalid). The Modified state indicates that a coherency granule is valid only in the cache storing the modified coherency granule and that the value of the modified coherency granule has not been written to system memory. When a coherency granule is indicated as Exclusive, then, of all caches at that level of the memory hierarchy, only that cache holds the coherency. The data in the Exclusive state is consistent with system memory, however. If a coherency granule is marked as Shared in a cache directory, the coherency granule is resident in the associated cache and in at least one other cache at the same level of the memory hierarchy, and all of the copies of the coherency granule are consistent with system memory. Finally, the Invalid state indicates that the data and address tag associated with a coherency granule are both invalid.

The state to which each coherency granule (e.g., cache line or sector) is set is dependent upon both a previous state of the data within the cache line and the type of memory access request received from a requesting device (e.g., the processor). Accordingly, maintaining memory coherency in the MP requires that the processors communicate messages across the system bus indicating their intention to read or write to memory locations. For example, when a processor desires to write data to a memory location, the processor must first inform all other processing elements of its intention to write data to the memory location and receive permission from all other processing elements to carry out the write operation. The permission messages received by the requesting processor indicate that all other cached copies of the contents of the memory location have been invalidated, thereby guaranteeing that the other processors will not access their stale local data.

In some MP systems, the cache hierarchy includes at least two levels. The level one (L1), or upper-level cache is usually a private cache associated with a particular processor core in an MP system. The processor core first looks for a data in the upper-level cache. If the requested data is not found in the upper-level cache, the processor core then access lower-level caches (e.g., level two (L2) or level three (L3) caches) for the requested data. The lowest level cache (e.g., L3) is often shared among several processor cores.

Typically, when a congruence class of one of the upper-level caches becomes full, data lines are "evicted" or written to the lower-level cache for storage. However, in any memory hierarchy, there may be several copies of the same data residing in the memory hierarchy at the same time. The policy of evicting lines to provide for more space in the upper-level cache may result in unnecessary writes to lower-level caches, which results in increased bandwidth demands.

Therefore, there is a need for a more intelligent system and method for managing a multi-level memory hierarchy to reduce unnecessary inter-cache communication.

SUMMARY OF THE INVENTION

A system and method for cache management in a data processing system are disclosed. The data processing system includes a processor and a memory hierarchy. The memory hierarchy includes at least an upper memory cache, at least a lower memory cache, and a write-back data structure. In response to replacing data from the upper memory cache, the upper memory cache examines the write-back data structure to determine whether or not the data is present in the lower memory cache. If the data is present in the lower memory cache, the data is replaced in the upper memory cache without casting out the data to the lower memory cache.

The above-mentioned features, as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
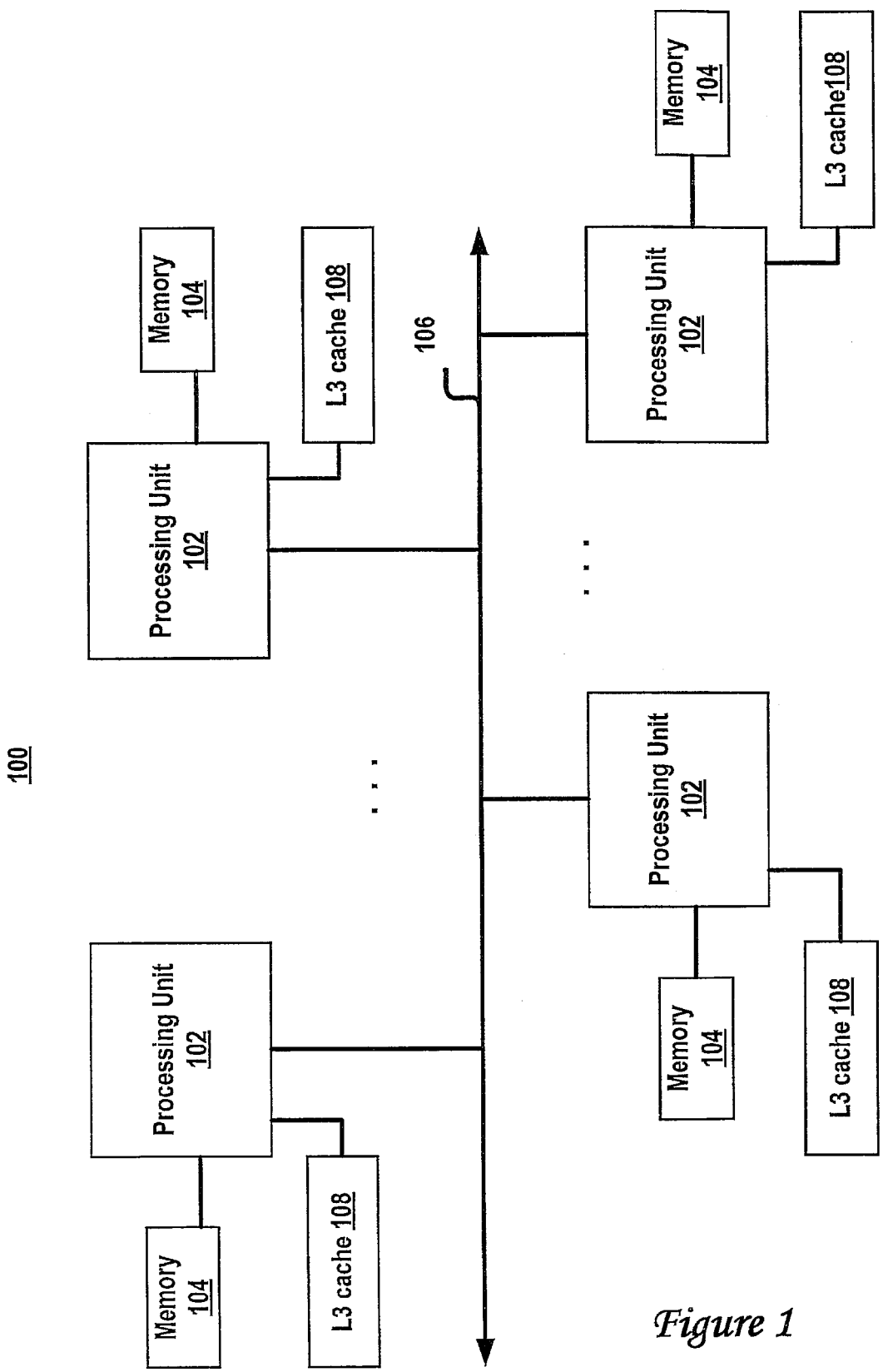
FIG. 1 is a block diagram of an exemplary multi-processor data processing system in which a preferred embodiment of the present invention may be implemented.

With reference now to the figures, and in particular, with reference to FIG. 1, there is illustrated a block diagram of a multi-processor data processing system 100 in which a preferred embodiment of the present invention may be implemented. As depicted, multi-processor data processing system 100 includes multiple processing units 102, which are each coupled to a respective one of memories 104. Each processing unit 102 is further coupled to an interconnect 106 that supports the communication of data, instructions, and control information between processing units 102. Also, look aside L3 caches 108 are preferably coupled to processing units 102. Because of the lower latencies of cache memories as compared with memories 104, L3 caches 108 are utilized by processing units 102 as castout storage facilities for recently accessed data. Each processing unit 102 is preferably implemented as a single integrated circuit comprising a semiconductor substrate having integrated circuitry formed thereon. Multiple processing units 102 and at least a portion of interconnect 106 may be advantageously be packaged together on a common backplane or chip carrier.

Those skilled in the art will appreciate that multi-processor data processing system 100 can include many additional components not specifically illustrated in FIG. 1. Because such additional components are not necessary for an understanding of the present invention, they are not illustrated in FIG. 1 or discussed further herein. It should also be understood, however, that the enhancements to data processing system to reduce unnecessary cache operations provided by the present invention are applicable to data processing systems of any system architecture and are in no way limited to the generalized multi-processor architecture or symmetric multi-processing (SMP) architecture illustrated in FIG. 1.

Figure 2:
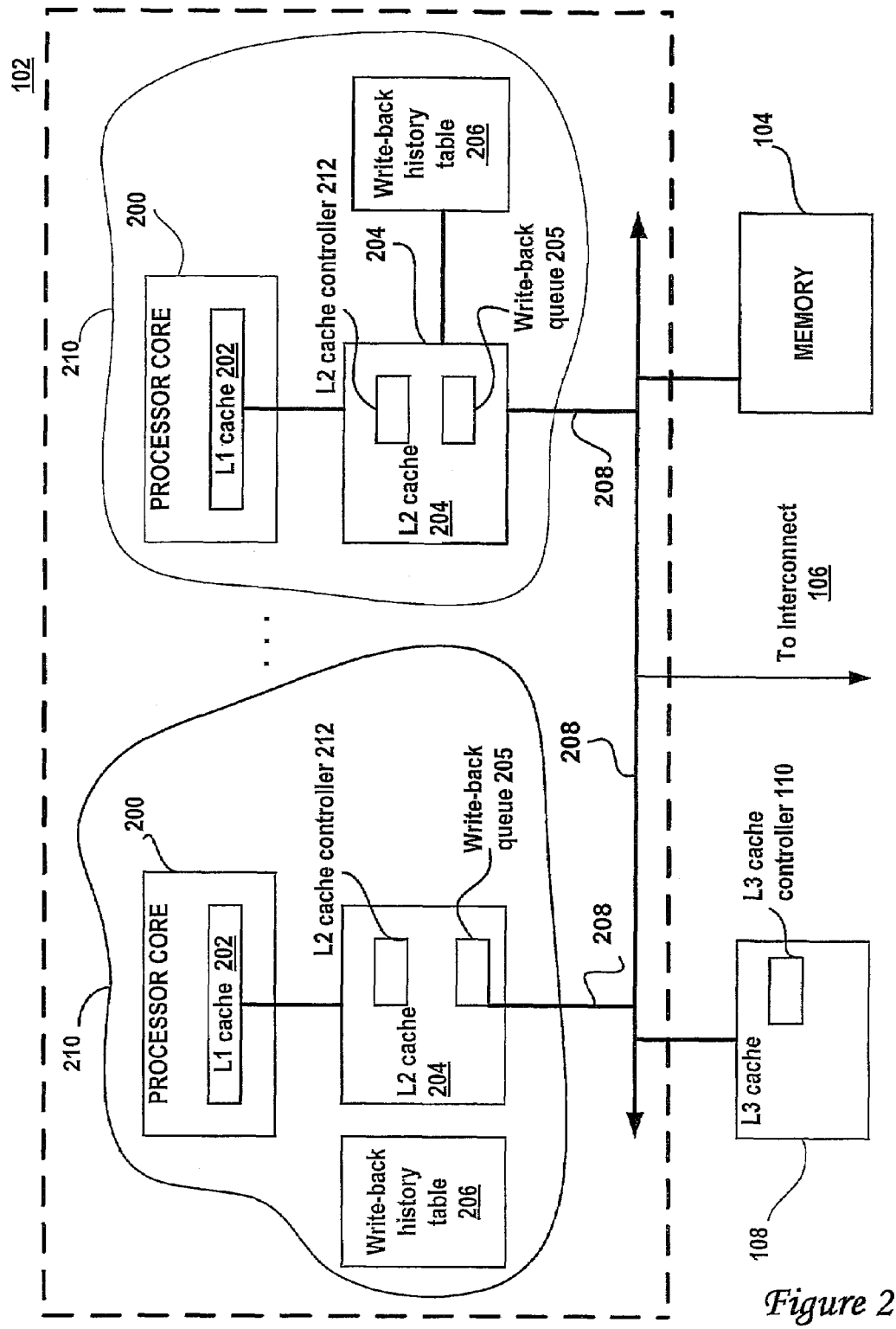
FIG. 2 is a more detailed block diagram of a processing unit in accordance with a preferred embodiment of the present invention.

Referring now to FIG. 2, there is illustrated a more detailed block diagram of a processing unit 102 of FIG. 1. As illustrated, processing unit 102 includes multiple processor cores 200, each of which includes a L1 cache 202. Coupled to each processor core 200 is a respective L2 cache 204, which further includes write-back queue 205 and an L2 cache controller 212 that sends a write-back request to look aside L3 cache 108 when a selected line (e.g., a victim line) to be cast out to look aside L3 cache 108 is loaded into write-back queue 205. However, persons with ordinary skill in this art will appreciate that an alternate embodiment of the present invention may include multiple processor cores 200 sharing a single L2 cache 204. Also, coupled to L2 cache 204 is write-back history table 206. L2 cache 204 allocates an entry within write-back history table 206 if L2 cache 204 receives a return message indicating that the victim line is already present in L3 cache 108. Write-back queue 205, described herein in more detail in conjunction with FIG. 3, buffers victim lines designated to be evicted from L2 cache 204. Write-back history table 206, also described herein in more detail in conjunction with FIG. 3, tracks cache lines of data and instructions that have been evicted from L2 cache 204 that are also present in L3 cache 108. Each assembly 210 that includes processor core 200, L2 cache 204, and write-back history table 206 is coupled by intra-chip interconnect 208 to other assemblies 210 within processing unit 102. L3 cache 108, coupled to processing unit 102, also includes L3 cache controller 110.

Figure 3:
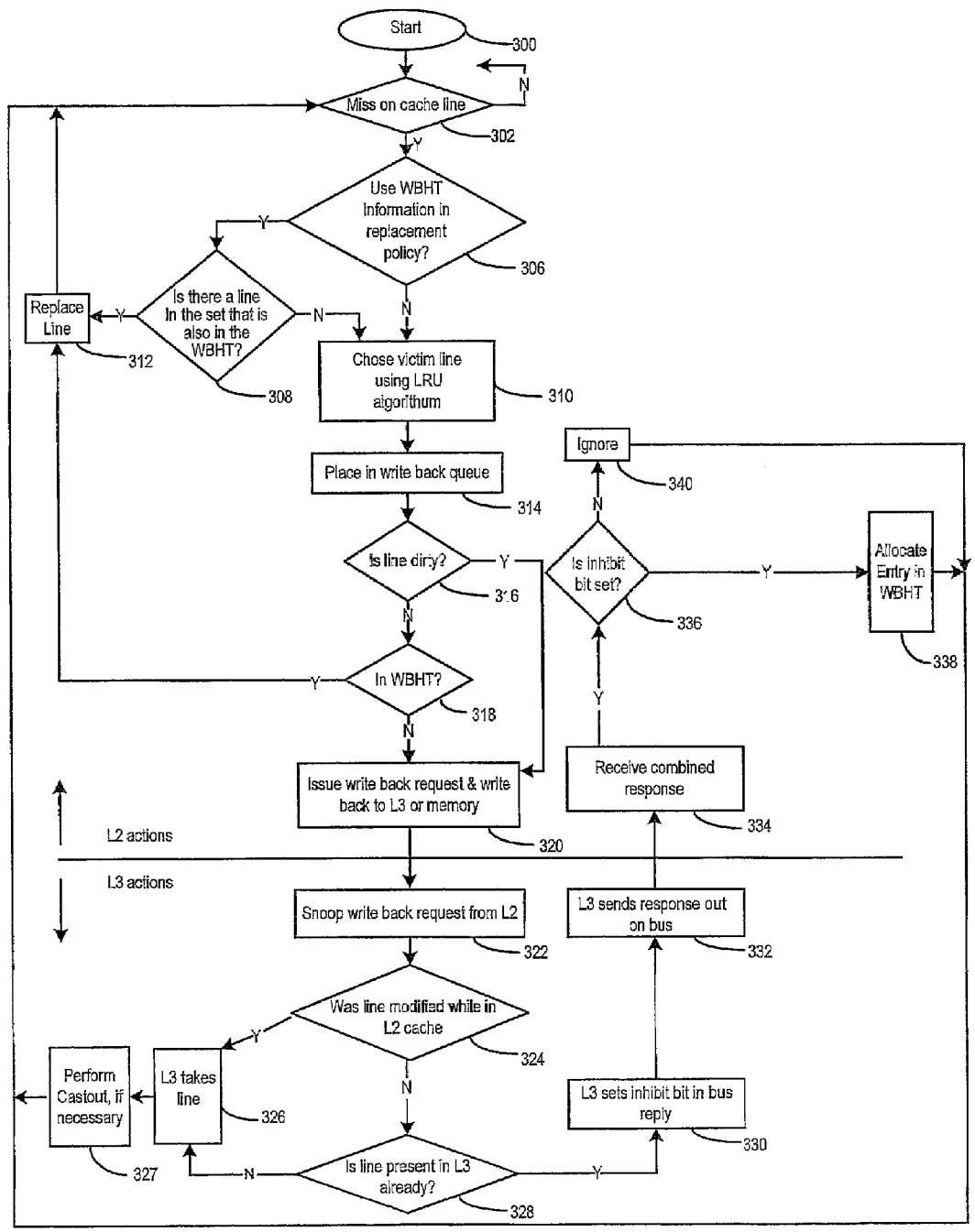
FIG. 3 is a high-level logical flowchart illustrating an exemplary cache operation in accordance with a preferred embodiment of the present invention.

With reference now to FIG. 3, there is illustrated a high-level logical flowchart of an exemplary method of reducing unnecessary cache operations in accordance with a preferred embodiment of the present invention. The process depicted in FIG. 3 involves operations by both L2 cache 204 (top part of FIG. 3) and L3 cache 108 (bottom part of FIG. 3). The process begins at step 300 and continues to step 302, which illustrates L2 cache controller 212 determining whether or not there is a miss on a cache line requested by the affiliated processor core 200 in L2 cache 204. If no cache miss has occurred, the process iterates at step 302.

However, if L2 cache controller 212 determines that there is a request for data missed in L2 cache 204, the process moves to step 306, which illustrates L2 cache controller 212 determining whether or not write-back history table information is utilized in replacement policy. The replacement policy may be varied by code running in multi-processor data processing system 100, a hardware switch that is physically toggled by a user, or another method. If L2 cache controller 212 determines that write-back history table information is utilized in the replacement policy, the process moves to step 308, which depicts processor core 200 determining whether or not write-back history table 206 includes an entry that indicates that there is a cache line in L2 cache 204 that is also included in L3 cache 108. If processor core 200 determines that there is a cache line in L2 cache 204 that is also included in L3 cache 108 by accessing write-back history table 206, the process moves to step 312, which illustrates a replacement of the cache line in L2 cache 204 that is determined to be also included in L3 cache 108. The process then returns to step 302, and proceeds in an iterative fashion.

Returning to step 308, if L2 cache controller 212 determines that there is not a cache line in congruence class L2 cache 204 that is also included in L3 cache 108 by accessing write-back history table 206, the process moves to step 310, which depicts L2 cache controller 212 utilizing a least-recently used (LRU) algorithm or another replacement algorithm. Returning to step 306, if L2 cache controller 212 determines that write-back history table information is not utilized in the replacement policy, L2 cache controller 212 also selects a victim cache line, as depicted in step 310, utilizing a default replacement policy.

After step 310, the process then continues to step 314, which illustrates L2 cache controller 212 placing the selected victim line into write-back queue 205. The process then proceeds to step 316, which depicts L2 cache controller 212 determining whether or not the selected victim line is dirty. Many data processing systems, including exemplary multi-processor data processing system 100, preferably utilize a coherency protocol, like the MESI protocol. For example, a dirty cache line is considered a Modified granule that is valid only in the cache storing the modified coherency and that the value of the modified coherency granule has not been written to memory 104 or any other type of data storage device (e.g., CD-ROM, hard disk drive, floppy diskette drive or others). A clean line may be marked with an Exclusive or Shared tag. If L2 cache controller 212 determines the selected victim line is dirty, the process continues to step 320, which illustrates L2 cache 204 issuing a write-back request to L3 cache 108. However, if L2 cache controller 212 determines the selected victim line is not dirty, the process continues to step 318, which depicts L2 cache controller 212 examining the contents of write-back history table 206 for an entry that indicates the selected victim line is also present in L3 cache 108. If L2 cache controller 212 determines the selected victim line is also present in L3 cache 108, the process then proceeds to step 312, which illustrates L2 cache controller 212 replacing the selected victim line without first writing the selected victim line to L3 cache 108 or memory 104. The process then returns to step 302 and continues in an iterative fashion.

Returning to step 318, if processor core 200 determines by reference to write-back history table 206 that the selected victim is not present in L3 cache 108, the process continues to step 320. The process continues to step 322, which depicts L3 cache controller 110 snooping a write-back request issued from L2 cache 204. The process then continues to step 324, which illustrates L3 cache controller 110 determining whether or not the selected victim line had been modified while present in L2 cache 204. If L3 cache 108 determines that the selected victim line had been modified while present in L2 cache 204, the process continues to step 326, which depicts L3 cache 108 accepting the selected victim line from L2 cache 204. If the selected victim line was modified while present in L2 cache 204, L3 cache 108 must accept and cache the selected victim line in order to preserve the changes made to the selected victim line while present in L2 cache 204. The process then continues to step 327, which illustrates L3 cache 108 performing a castout of a data line from L3 cache 108 according an algorithm such as a least recently used (LRU) algorithm. The process then returns to step 302 and proceeds in an iterative fashion.

The purpose of the present invention is to reduce unnecessary inter-cache operations. When a selected victim line has not been modified while present in L2 cache 204, L2 cache 204 first examines the contents of a write-back history table 206 to determine if the selected victim line is already present in L3 cache 108.

It is possible that when processor core 200 initially requests and processes a cache line, the line is written to only L1 cache 202 and L2 cache 204. The line is not written to look aside L3 cache 108 until L2 cache 204 casts out a line to make room for a new data line requested by processor core 200. Therefore, each time a clean (not modified) line is selected to be cast out of L2 cache 202, L2 cache 202 must examine write-back history table 206 to determine whether or not a copy of the selected victim line is already present in L3 cache 108. If an entry in write-back history table 206 indicates that a copy of the selected victim line is already present in L3 cache 108, which serves as a castout or victim cache, casting out the selected victim line to L3 cache 108 would be an unnecessary function. The present invention inhibits these unnecessary functions.

Therefore, returning to step 324, if L3 cache 108 determines that the selected victim line has not been modified while present in L2 cache 204, the process continues to step 328, which illustrates L3 cache 108 determining whether or not the selected victim line is already present in L3 cache 108. If L3 cache 108 determines that the selected victim line is not already present in L3 cache 108, the process continues to step 326, which depicts L3 cache 108 accepting the selected victim line received from L2 cache 204. This process is not necessary to preserve a copy of the selected victim line since the data in the selected victim line in L2 cache 204 also resides in memory 104, but is advantageous for latency purposes. Then, if L3 cache 204 is filled with castout lines from L2 cache 204, a data line from L3 cache 204 must be cast out, preferably to memory 104, to accommodate the selected victim line from L2 cache 204. Therefore, the process then continues to step 327, which illustrates L3 cache 108 casting out a data line to accommodate the selected victim line from L2 cache 204, if necessary. The process then returns to step 302 and continues in an iterative fashion.

Returning to step 328, if L3 cache 108 determines that the selected victim line is valid in L3 cache 108, the process continues to step 330, which illustrates L3 cache 108 setting an inhibit bit in the response to the write-back request from L2 cache 204. Setting the inhibit bit indicates to L2 cache 204 that the selected victim line is already present in the L3 cache 108 and that L2 cache 204 may replace the selected victim line with newly-requested data without casting out the selected victim line to L3 cache 108. Persons with ordinary skill in this art will appreciate that an actual inhibit bit is not required to be set by L3 cache 108. L3 cache 108 may achieve the same result by sending an alternate bus response that indicates the validity of the selected victim line in L3 cache 108.

The process then continues to step 332, which depicts L3 cache 108 sending the response with the inhibit bit set out on intra-chip interconnect 208. The process proceeds to step 334, which illustrates L2 cache 204 receiving the response from L3 cache 108. The process then continues to step 336, which depicts L2 cache 204 determining whether or not the response includes an inhibit bit set by L3 cache 108. If L2 cache 204 determines that the response includes an inhibit bit set by L3 cache 108. The process then moves to step 338, which illustrates L2 cache 204 allocating an entry in write-back history table 206 indicating that the selected victim line is already present and valid in L3 cache 108. If L2 cache 204 determines that write-back history table 206 is full, least recently accessed entries in write-back history table 206 are merely overwritten when L2 cache 204 allocates a new entry in step 338. On the next cycle of the process, if the selected victim line is considered as a candidate for cast out from L2 cache 204, L2 cache 204 will determine that the line is valid and present in L3 cache 108 by locating the entry in write-back history table 206 and will evict the selected victim line without attempting to write-back the selected victim line to L3 cache 108 or memory 104. The process then returns to step 302 and proceeds in an iterative fashion. However, returning to step 336, if L2 cache 204 determines that the response does not include an inhibit bit set by L3 cache 108, the process continues to step 340, which illustrates L2 cache 204 ignoring the response sent by L3 cache 108. The process then returns to step 302 and continues in an iterative fashion.

As has been described, the present invention is a system and method of reducing unnecessary cache operations within a data processing system. When a L2 cache controller detects a cache miss in an L2 cache, the L2 cache controller core selects a line (e.g., a victim line) to be cast out of the L2 cache to make room for a newly-requested cache line. The L2 cache controller determines the state of the victim line with respect to the L3 cache and memory by examining the contents of a write-back history table. The write-back history table includes entries that indicate the lines that have been recently evicted from the L2 cache and written to the L3 cache. If an entry in the write-back history table indicates that the victim line has been recently evicted from the L2 cache and that line is also valid in the L3 cache, the victim line is replaced by the newly-requested line without first writing the victim line to the L3 cache or memory. If, however, the victim line is not characterized by an entry in the write-back history table to be recently evicted from the L2 cache and valid in the L3 cache, an entry is made in the write-back history table to reflect such status. This system and method inhibits the redundant writing of cache lines to a L3 cache or memory if the cache lines are determined to be both present in the L3 cache or memory and valid (e.g. unmodified). Therefore, this system and method reduces wasted bandwidth normally utilized by such redundant writing of cache lines.

Of course, persons having ordinary skill in this art are aware that while this preferred embodiment of the present invention reduces the unnecessary writing of cache lines between an L2 cache and L3 cache and/or memory, the present invention may be implemented to reduce the unnecessary of writing any type of data among different levels of any memory hierarchy. Examples of such implementations include: the utilization of random access memory, writeable storage media (e.g., floppy diskette, hard disk drive, read/write CD-ROM, optical media), and flash memory among the different levels of the memory hierarchy. Also, the present invention may be implemented among different levels of data processing systems, where a client might suppress the writing of data to a server if the data is already present and valid on the server.

It should be understood that at least some aspects of the present invention may alternatively be implemented in a program product. Program defining functions on the present invention can be delivered to a data storage system or a computer system via a variety of signal-bearing media, which include, without limitation, non-writable storage media (e.g., CD-ROM), writable storage media (e.g., a floppy diskette, hard disk drive, read/write CD-ROM, optical media), and communication media, such as computer and telephone networks including Ethernet. It should be understood, therefore in such signal-bearing media when carrying or encoding computer readable instructions that direct method functions in the present invention, represent alternative embodiments of the present invention. Further, it is understood that the present invention may be implemented by a system having means in the form of hardware, software, or a combination of software and hardware as described herein or their equivalent.

While the invention has been particularly shown and described with reference to a preferred embodiment, it will be understood by those skilled in the art that various changes in form and detail may be made therein without departing from the spirit and scope of the invention.

What is claimed is:

1. A method for cache management in a data processing system, wherein said data processing system includes a processor and a memory hierarchy, wherein said memory hierarchy includes at least an upper level cache having a lower access latency, at least a lower level cache having a higher access latency, and a write-back data structure, said method comprising:
   in response to a need to evict a victim cache line from a set of cache lines in said upper level cache, the upper level cache preferentially selecting the victim cache line from among the set of cache lines based upon said write-back data structure indicating said lower level cache holds a copy of the victim cache line;
   in response to selecting as said victim cache line a cache line among the set that said write-back data structure indicates as having a copy in the lower level cache, replacing said victim cache line in said upper level cache without writing data of the victim cache line to said lower level cache and without accessing a memory directory of said lower level cache;
   prior to selecting the victim cache line, determining whether or not information in said write-back data structure is to be utilized to select the victim cache line; and
   in response to determining said information is not to be utilized to select the victim cache line, the upper level cache selecting the victim cache line according to access chronology of the cache lines in the set.

2. The method in claim 1, wherein selecting the victim cache line according to access chronology further comprises:
   choosing a least recently used line in the set as the victim cache line; and
   placing said victim cache line in a write-back queue.

3. A method for cache management in a data processing system, wherein said data processing system includes a processor and a memory hierarchy, wherein said memory hierarchy includes at least an upper level cache having a lower access latency, at least a lower level cache having a higher access latency, and a write-back data structure, said method comprising:
   in response to a need to evict a victim cache line from a set of cache lines in said upper level cache, the upper level cache preferentially selecting the victim cache line from among the set of cache lines based upon said write-back data structure indicating said lower level cache holds a copy of the victim cache line;
   in response to selecting as said victim cache line a cache line among the set that said write-back data structure indicates as having a copy in the lower level cache, replacing said victim cache line in said upper level cache without writing data of the victim cache line to said lower level cache and without accessing a memory directory of said lower level cache;
   in response to said upper level cache writing said data to said lower level cache, said lower level cache determining whether or not said data had been modified in said upper level cache and whether or not said data received from the upper level cache are already present in said lower level cache;
   in response to said lower level cache determining said data had been modified in the upper level cache and the data received from the upper level cache are already present in said lower level cache, the lower level cache issuing a message indicating said data are already present in said lower level cache; and
   in response to said message, updating said write-back data structure to indicate presence of the data in the lower level cache.

4. The method in claim 3, wherein issuing a message further comprises:
   setting an inhibit bit in a bus reply; and
   sending said bus reply on a bus within said data processing system.

5. A computer program product, comprising:
   a computer readable storage medium; and
   emulation code within the computer readable storage medium and executable by a data processing system to emulate operation of a physical data processing system including an upper level cache having a lower access latency, a lower level cache having a higher access latency and a write-back data structure, said emulation code including:
      code that emulates the upper level cache, in response to a need to evict a victim cache line from a set of cache lines in the upper level cache, preferentially selecting the victim cache line from among the set of cache lines based upon said write-back data structure indicating said lower level cache holds a copy of the victim cache line;
      code that emulates said upper level cache replacing said victim cache line in said upper level cache without writing data of the victim cache line to said lower level cache and without accessing a memory directory of said lower level cache in response to selecting as the victim cache line a cache line among the set that said write-back data structure indicates as having a copy in the lower level cache;

code that emulates said data processing system determining, prior to selecting the victim cache line, whether or not information in said write-back data structure is to be utilized to select the victim cache line; and code that emulates said data processing system, in response to determining said information is not to be utilized to select the victim cache line, selecting the victim cache line according to access chronology of the cache lines in the set.

6. The computer program product in claim 5, wherein said code that emulates said data processing system selecting the victim cache line according to access chronology further comprises:

code that emulates said data processing system choosing a least recently used line in the set as the a victim cache line; and code that emulates said data processing system placing said victim cache line in a write-back queue.

7. A computer program product, comprising:

a computer readable storage medium; and emulation code within the computer readable storage medium and executable by a data processing system to emulate operation of a physical data processing system including an upper level cache having a lower access latency, a lower level cache having a higher access latency and a write-back data structure, said emulation code including:

code that emulates the upper level cache, in response to a need to evict a victim cache line from a set of cache lines in the upper level cache, preferentially selecting the victim cache line from among the set of cache lines based upon said write-back data structure indicating said lower level cache holds a copy of the victim cache line;

code that emulates said upper level cache replacing said victim cache line in said upper level cache without writing data of the victim cache line to said lower level cache and without accessing a memory directory of said lower level cache in response to selecting as the victim cache line a cache line among the set that said write-back data structure indicates as having a copy in the lower level cache;

code that emulates said data processing system writing said data from the upper level cache to said lower level cache;

code that emulates said lower level cache determining whether or not said data had been modified in said upper level cache and are already present in said lower level cache, and responsive to an affirmative determination thereto, issuing a message to said upper level cache indicating said data are already present in said lower level cache; and code that emulates the data processing system, responsive to the message, updating said write-back data structure to indicate presence of the data in the lower level cache.

8. The computer program product in claim 7, wherein said code that emulates said data processing system issuing the message further comprises:

code that emulates said data processing system setting an inhibit bit in a bus reply; and code that emulates said data processing system sending said bus reply on a bus within said data processing system.

* * * * *